United States Patent Office 3,028,343
Patented Apr. 3, 1962

3,028,343
PREPARATION OF A FOAMED METHYL CHLOROACRYLATE POLYMER
Harry D. Anspon, Easton, Pa., assignor to General Aniline & Film Corporation, New York, N.Y., a corporation of Delaware
No Drawing. Filed Mar. 1, 1957, Ser. No. 643,242
8 Claims. (Cl. 260—2.5)

The invention here presented is a new and useful form of "blown" or "foamed" polymer, and the process for making it; particularly a foamed polymer of polymethyl-alpha-chloroacrylate containing a new and unexpected foaming agent, the preferred foaming agent being the dyestuff known as "Rhodamine B Extra Base." This monomer can be polymerized while in the form of beads of polymer and foamed, either as such, whereupon they coalesce during the foaming procedure, or embedded in other polymers and foamed, or copolymerized with other monomers and the copolymer foamed.

The making of "blown" rubber is well known, and is usually accomplished by mixing into the rubber such substances as corn oil and the like which either vaporize or decompose at a relatively low temperature to yield a gas which forms blisters and bubbles in the rubber, but this procedure is always conducted upon rubber in the form of a large solid body or slab of rubber containing the blowing agent. Similar processes have been applied to other synthetic polymers and a wide range of compounds have been tested, most of them being ineffective except in massive bodies.

According to the present invention it is now found that polymers of methyl alpha-chloroacrylate, polymerized under conditions which yield beads or globules of polymer are susceptible to a very excellent foaming reaction produced by the presence, in the beads, of the dyestuff known as "Rhodamine B Extra Base." It is found that these beads in all but the most minute sizes foam excellently when the dyestuff is incorporated, and the foaming reaction is still better if there are present traces of moisture and traces of the polymerization catalyst known as Porofor N. (azo-bis-isobutyronitrile).

After discovery of the foaming properties of polymers and copolymers of methyl alpha-chloroacrylate as disclosed in U.S. 2,684,341, experiments were run on the foaming of these polymers obtained in different forms. Methyl alpha-chloroacrylate polymer obtained in solid castings was observed to foam very well but such solid castings are difficult and hazardous ones to make. However, methyl alpha-chloroacrylate polymer obtained as a very fine powder from emulsion or suspension polymerizations did not foam or expand in the loose powder form. Polymer granules obtained from grinding and pulverizing cast methyl alpha-chloroacrylate polymer which did foam, were observed not to expand when heated as loose granules. These observations suggested that the ratio of surface area to mass of the polymer granules was important in determining whether expansion by foaming would occur. It was likely that as the surface area to mass ratio became larger, the diffusion rate of the gases, formed by reaction of the groups within polymer molecules, through the polymer became important. When the surface area to mass ratio is small, as in a large sphere (10 mm. O.D.), the diffusion rate of these gases through the polymer is readily exceeded by the large amount of gases evolved from the large mass of polymer and expansion by foaming results. The gases are not diffused out as fast as they are formed and the excess gas over and above that dissolved in and diffused out of the polymer blows the polymer out by formation of gas bubbles within the polymer. However, when the ratio of surface area to mass is very great, as in spheres below 2–3 mm. in diameter, the small amount of gas formed by the small mass of polymer diffuses through the polymer and reaches a surface where it can escape. In larger masses, instead of escaping it is joined by gas from additional polymer and the accumulated gas blows the polymer out instead of escaping at a surface.

From these considerations, it also can be seen that in order to obtain expansion of small granules of polymer the ratio of surface area to mass should be as low as geometrically possible. As is well known, the sphere geometrically represents the ultimate in low ratio of surface area to mass.

The sphere shape has an additional advantage in that material in this shape can be readily poured or flowed. In adding insulation to containers or placing it in hard to reach places there is a definite advantage in being able to flow the insulation into place. In addition, these spheres added to slurries such as cement and water or plaster and water tend to make the resultant slurry pour more easily which makes for easier handling of the slurry.

With the sphere as the most desirable shape, the possibility of expansion of a given sphere size depends upon rate of gas evolution, solubility of the gas in the polymer and the rate of diffusion of the gas through the polymer. The latter two properties are difficult to alter without complete change of the polymer properties such as might be obtained with a different copolymer. However, it has been found possible to change the rate of gas evolution readily by incorporation of catalysts in the polymer as by rapidly bringing heat into the polymer so that foaming is accomplished at higher temperatures. This latter method is limited by the fact that if the temperature becomes high enough to cause rapid gas evolution, the polymer may be so soft and fluid that the gas bursts out of the polymer or the solution and diffusion rate may be altered so much that no expansion occurs. These difficulties are best overcome by di-electric heating of the polymer by which method the center of the polymer may be heated to a higher temperature than the outside of the polymer. The incorporation of catalysts for gas evolution in the polymer allows one to foam even small beads without employment of special heating methods, however.

The most convenient way of obtaining polymer spheres is by suspension polymerization.

The invention lies in the foaming of spheres of methyl alpha-chloroacrylate polymer or copolymers which spheres are obtained by suspension polymerization. The expansion of these polymer spheres results in foamed spheres which are convenient to handle.

It has also been found possible to heat these spheres of methyl alpha-chloroacrylate polymer in confined molds whereby the spheres expand by foaming and are knit together at the same time forming a coherent tough resilient foamed mass. Expanded sheets made from foamed beads exhibit more resiliency than do foamed sheets made from cast polymer.

By embedding these beads of methyl alpha-chloroacrylate polymer in other monomers and polymerizing the monomer employed for embedding agent, it is possible to obtain a coherent polymer block which when heated can be expanded by the foaming of the embedded spheres of methyl alpha-chloroacrylate polymer. If desired, however, the foamed beads themselves may be embedded in other polymers to serve as insulation.

Probably one of the chief advantages of the foaming of beads of methyl alpha-chloroacrylate polymer lies in the less hazardous operations involved in preparing foamed sheets or articles from bead polymers. Methyl alpha-chloracrylate is a powerful lachrymator and also is a skin vesicant. These properties make the handling of this monomer very hazardous, especially so when the monomer must be transferred to numerous casting cells which are subject to pinhole leaks. A few drops of this monomer are sufficient to make a room untenable because of its lachrymatory action.

With the preparation and use of bead polymers considerably less risk is involved. The monomer may be prepared by dehydrohalogenation of methyl alpha, beta-dichloropropionate and it may be steam distilled directly into an autoclave in which the polymer spheres are to be made. After conversion of the steam distilled monomer into polymer spheres, these polymer spheres may be handled with impunity. Because of their spherical shape they can be poured easily into confined molds, foamed in the mold and the foamed article can be removed from the mold. If desired, the beads may be foamed in place in the walls of an article to be insulated or reinforced with foam. The advantages involved in handling the non-toxic polymer spheres compared to the handling of the toxic monomer lies principally in the greater safety of handling the polymer spheres. However, this is not the only advantage. The beads or polymer spheres do not require costly liquid tight cells for their casting. In fact, the whole casting process can be replaced when using bead polymer. The bead polymer may be molded into any desired shape and foamed in that shape or the beads may be added to a mold and foamed in place in the mold. Whereas, the bead polymer will conform to the shape of a mold, it is rather difficult to get a block of cast polymer to conform to the shape of a mold in which it is foamed if the cast polymer is not an exact miniature of the shape of the mold in which it is being foamed.

The preparation of spherical beads by suspension polymerization of methyl alpha-chloroacrylate is much more convenient than the preparation of polymer granules by grinding of cast polymer. The control of temperature during the polymerization of cast polymer is difficult unless special conditions are employed whereas the control of temperature during suspension polymerization is readily accomplished through control of the temperature of the water which is a cheap, fluid, good heat transfer agent. The size of beads obtained can be much more easily regulated in suspension polymerization than in grinding and in addition the beads are readily obtained as perfect spheres in suspension polymerization whereas it is difficult to grind them into spheres and even if it could be done much of the polymer is lost in unusable fine powder obtained during grinding.

The exact size of the polymer sphere suitable for foaming depends upon several factors mentioned earlier. These factors control the rate of gas evolution from the polymer. The faster the rate of gas evolution from the polymer (without at the same time causing too great an increase in the solubility or diffusion of the gas or too easy escape of the gas from the polymer), the smaller the size of the polymer sphere which can be foamed. Among the factors increasing the rate of gas evolution are catalysts whose concentration in the polymer can be varied to change the rate of gas evolution and increased temperatures of foaming, particularly when achieved by dielectric heating. It has been possible to foam polymer spheres as small as 0.027″ in diameter by using 4% Rhodamine B Extra Base in the polymer and heating these beads at 160° C. in an oil bath whereby their expansion is achieved in approximately 1 minute.

Thus the process of the invention provides a new, unexpected and very useful procedure for the foaming of polymethyl-alpha-chloroacrylate in the presence of "Rhodamine B Extra Base" together with traces of moisture and small amounts of Porofor N to produce a new and highly useful foamed synthetic polymer. Other objects and details will be apparent from the following description.

The details of the procedure for making polymer beads are well shown in the copending application, Serial No. 641,242 filed Feb. 20, 1957, and a new and useful method for making the raw material; the methyl alpha-chloroacrylate is shown in the copending application, Serial No. 632,260 filed Jan. 3, 1957 which are hereby and herewith incorporated into the present application as portions thereof.

The preferred foaming agent is the dyestuff known as Rhodamine B Extra Base which has the following structural formula:

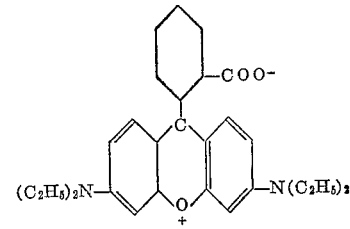

or

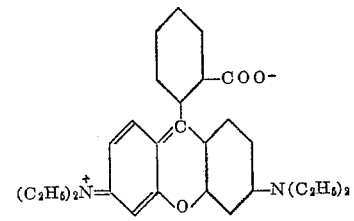

It is definitely known that the material used is not the hydrochloride which is too insoluble in the polymer to be usable, nor is it the sodium salt of the acid since it leaves no significant residue on ignition.

It is believed that the rapid foaming action in the beads described in the proposal is due principally to the presence of the Rhodamine B Extra Base and that the Porofor N functions principally as a polymerization catalyst and very slight, if at all, as a blowing agent. When Porofor N itself is employed as a blowing agent, much larger quantities are required to be incorporated into polymer mixes. Such quantities of Porofor N incorporated in the monomer would cause inordinately rapid polymerization of the monomer. Rhodamine B Extra Base alone is sufficient to cause a marked increase in foaming rate of methyl alpha-chloroacrylate polymer.

We have obtained evidence that the water and possibly the Porofor N present in the beads obtained by suspension polymerization aid somewhat in speeding up foaming; but the Rhodamine B Extra Base is by far the most effective of these possible agents present in the bead polymer. Rhodamine B Extra Base in methyl alpha-chloroacrylate polymer containing no Porofor N and very little water speeds up foaming, but the foaming rate is not quite as rapid as with beads containing both Porofor N and water.

A concentration of 4.2% of Rhodamine B Extra Base based upon polymer weight is as high a concentration as required to cause rapid and satisfactory foaming of bead polymers containing methyl alpha-chloroacrylate polymer or copolymer. However, higher concentrations may be used, up to about 10%, beyond which it would not be economically sensible to continue addition of the expensive dyestuff.

Beads composed of a copolymer of methyl alpha-chloroacrylate and acrylonitrile do little or no foaming at 160° C. unless Rhodamine B Extra Base is present in the composition. The smallest beads foamed to date were ones of a copolymer of methyl alpha-chloroacrylate and acrylonitrile containing 3.9% by weight of Rhodamine B Extra Base. These beads were expanded from 0.017″ in diameter to 0.058″ in diameter (3.41 volume expansion) by heating them for 60 minutes at 160° C. How much smaller beads could be foamed has not been determined.

It is believed the expansion by foaming is due to decomposition of the chloroacrylate polymer catalyzed by the diethylamino groups present in Rhodamine B Extra Base. Polymers of alpha-chloroacrylic esters of alcohols containing up to 7 carbon atoms may be used in this process. In addition to Rhodamine B Extra Base and the small amounts of water and Porofor N present in the polymer beads, it has been found advantageous to add tertiary-butyl alcohol to the polymer in order to reduce the amount of the expensive dyestuff without sacrifice of the foaming properties, but with improved foaming properties for these agents appear to be synergistic in their action.

The following examples are offered as showing the best, presently known, method of practising the invention, but not as imposing any limitations on the claims solicited.

*Example 1.—Methyl Alpha-Chloroacrylate Beads*

To 800 ml. of distilled water in a 2 liter resin flask equipped with baffles and fitted with a thermometer, a centrifugal mechanical stirrer, a condenser, and a gas inlet tube and gas outlet tube for prepurified nitrogen (Matheson) was added 0.6 g. of polyvinyl alcohol (DuPont Elvanol Grade 72–51; Viscosity Range 45–55 centipoises for 4% solution in water at 20° C. and 98.5 to 100% Hydrolyzed), and 10 ml. of a 1 N sodium adipate buffer solution. This solution was heated to reflux with a stream of prepurified nitrogen passing over the solution. After reaching reflux the solution was allowed to cool to 60° C. under prepurified nitrogen.

To this stirred solution was added a solution of 1.2 g. of recrystallized Porofor N (azo-bis-isobutyronitrile) in 120 g. of methyl alpha-chloroacrylate. The resulting suspension was stirred continually while the temperature was maintained at 56–66° C. for a period of 2 hours. The reaction had to be cooled occasionally during the first hour to keep the temperature within these limits. After the 2 hours at 56–66° C. the temperature was raised quickly to 100° C. and held at 99–100° C. for 15 minutes. The product then was filtered hot, washed with water and methanol and dried for 1 day in a vacuum oven at room temperature followed by 1 hour under vacuum at 110° C. The opaque white spherical polymer beads were obtained in practically quantitative yield and they were sieved into the following sizes. The approximate percentage of the total weight of beads in each size is listed.

1% of polymer spheres of on 10 mesh size
42% of polymer spheres of through 10 on 20 mesh size
51% of polymer spheres of through 20 on 40 mesh size
4% of polymer spheres of through 40 on 60 mesh size
½% of polymer spheres of through 60 on 80 mesh size
½% of polymer spheres of through 80 on 100 mesh size
1% of polymer powder of through 100 mesh size

*Example 2.—Methyl Alpha-Chloroacrylate Beads Catalyzed With 4.2% of Rhodamine B Extra Base*

Another suspension polymerization was run with the same quantities of reagents in the same type setup and in the same manner as disclosed in Example 1 but with the addition of 5.0 g. (4.2% of dye based on weight of methyl alpha-chloroacrylate used) of Rhodamine B Extra Base to the solution of Porofor N and methyl alpha-chloroacrylate which was added to the stirred solution of polyvinyl alcohol and sodium adipate in water. The reaction suspension was maintained at 58–64° C. for 1 hour and 40 minutes at which time the polymerization was substantially complete. The suspension was stirred for 15 hours at room temperature and then heated to 99° C. The clear dark red polymer beads were filtered, washed with water and methanol and dried in a vacuum oven at 60° C. The dry beads weighed 107 g. and were accompanied by 3 g. of polymer in the shape of needles, pears and distorted spheres.

Five polymer beads were placed at the bottom of a test tube which contained a slit along its midpoint. This tube and its contents were immersed in a mineral oil bath at 160° C. to the depth of the slit which allowed the oil to enter the tube and cover the beads. In a period of 1.251 minutes the beads had foamed and expanded so that three of them had risen to the surface of the oil where they were soon joined by the other two foamed beads. The beads employed for this test were 0.070±0.005″ in diameter. Three out of five beads from Example 2 measuring 0.029±0.003″ in diameter rose to the surface in 1.1 minutes. In contrast, five beads of 0.105±0.005″ in diameter from the run described in Example 1 required 75 minutes of heating under these same conditions to get 3 out of 5 beads to rise to the surface of the oil. Beads from Example 1 measuring 0.039±0.002″ in diameter had not risen to the surface of the oil at 160° C. after heating for 160 minutes, and 76 more minutes of heating were required to cause any of the beads to rise to the surface. It is apparent that with the beads in Example 2, very small diameter beads can be foamed; whereas with the beads in Example 1, only the larger diameter beads can be foamed in a reasonable length of time under the test conditions.

*Example 3.—Beads of Methyl Alpha-Chloroacrylate Acrylonitrile Copolymer*

In a 500 ml. resin flask fitted with a thermometer, a mechanical centrifugal stirrer, a condenser, and a gas inlet and outlet tube was placed 200 ml. of a solution of sodium sulfate (267 g. of $Na_2SO_4$ made up to 1 liter of solution with distilled water), 2.5 g. of bentonite and 5 ml. of a 1 molar sodium adipate solution. This suspension was stirred and heated to reflux with a stream of prepurified nitrogen passing through the flask and the suspension was allowed to cool to 60° C. under prepurified nitrogen. To this stirred suspension at 60° C. there was added a solution of 16.5 ml. (0.25 mole) of acrylonitrile, 25 ml. (0.25 mole) of methyl alpha-chloroacrylate and 0.43 g. of Porofor N (azo-bis-isobutyronitrile). The suspension was maintained at 55–65° C. for a period of 1 hour. The temperature of the suspension then was raised to 70° C. for 15 minutes and then maintained at 95–99° C. for ½ hour. The beads were filtered off on a 60 mesh screen and washed free of bentonite and sodium sulfate with water and distilled water. The washed beads were dried for 60 hours under vacuum at 60° C. The copolymer beads obtained weighed 37.7 g. or 87% of the theoretical weight of 43.2 g. of copolymer was obtained as beads not passing through 60 mesh screen.

*Example 4.—Beads of Methyl Alpha-Chloroacrylate Containing 1.1% of Rhodamine B Extra Base*

In a 500 ml. resin flask fitted with a thermometer, a mechanical centrifugal stirrer, a condenser, and gas inlet and outlet tubes was placed 200 ml. of a sodium sulfate solution (267 g. of sodium sulfate made up to 1 liter of solution with distilled water), 2.5 g. of bentonite and 5 ml. of a 1 molar sodium adipate solution. This mixture was heated to reflux with stirring under prepurified nitrogen. The suspension was cooled to 60 C. under prepurified nitrogen. To the stirred suspension at 60° C. was added a solution of 50 ml. (0.5 mole) of methyl alpha-chloroacrylate, 0.3 g. of Porofor N (azo-bis-isobutyronitrile) and 0.68 g. (1.1% of dye based upon weight of methyl alpha-chloroacrylate) of Rhodamine B Extra Base. This suspension was stirred with the temperature maintained at 59–70° C. for approximately ¾ hr. and the temperature then was raised to 100° C. where it was maintained at 95–100° C. for 15 min. The bright red beads were filtered through a 60 mesh screen, washed with water and with methanol and dried for 16 hours under vacuum at 60° C. The dried beads were sieved to obtain 36.3 g. of beads of through 10 on 20 mesh size, and 20.0 g. of beads of through 20 on 60 mesh size and 0.2 g. of beads which went through 60 mesh. The total of 56.5 g. of beads was 94% of the theoretical amount.

Five beads of 0.046±0.005″ in diameter were placed on the bottom of a test tube which contained a slit along its midpoint. This tube and its contents were immersed in a mineral oil bath at 160° C. to the depth of the slit which allowed the oil to enter the tube and cover the beads. In a period of 5.1 minutes the beads had foamed and expanded so that three of them had risen to the surface of the oil where they were soon joined by the other two foamed beads.

*Example 5.—Foaming of Methyl Alpha-Chloroacrylate Beads To Produce Expanded Beads*

Twenty grams of methyl alpha-chloroacrylate bead polymer containing 4.2% Rhodamine B Extra Base was placed in a Pyrex tray 12" x 8" x 2". These polymer beads on the tray were heated for 10 min. in a circulating air oven at 160° C. and the loose beads expanded about 3 times in diameter to form bright red foamed beads which were resilient and springy. These expanded beads formed a loose easily flowing mass which was readily poured or transferred. The dye had been affected very little by foaming for the beads fluoresced a brilliant red.

*Example 6.—Foaming of Beads in a Confined Mold*

In a vial of 19 ml. capacity was placed 2.0 g. of methyl alpha-chloroacrylate polymer beads containing 4% Rhodamine B Extra Base. These beads were spheres which passed through a 10 mesh sieve and were collected on a 40 mesh sieve. The top of the vial was closed with a lightly tightened screw cap so that air could still escape from the vial but solid material could not escape. The vial was placed in a close-fitting test tube which was immersed for most of its length in a circulating oil bath at 160° C. The tube was raised periodically and the vial and its contents were examined during the heating cycle.

| Elapsed Time in Oil Bath at 160° C., minutes | Remarks |
|---|---|
| 5 | Polymer beads were beginning to expand. |
| 10 | Beads had expanded to about ½ volume of vial. |
| 15 | Beads were compressed slightly and expanded to ¾ volume of vial. |
| 20 | Beads were compressed and expanded to top of vial. |
| 30 | Vial packed with compressed foam. |

At the end of 1 hour of heating at 160° C. the vial was removed and examined. It was apparent that the beads had been compressed by foaming and they could not be removed from the vial except by breaking the vial. The foam protected the glass vial and it was more difficult to break than usual. Even after cracking the glass vial, the pieces of glass had to be picked from the foamed rod for they tended to stick to the foamed rod.

The deep red foamed rod was resilient and fairly strong. A rattailed file was driven through the side of the foamed rod without destroying the rod of foam although a ¼" hole was punched through the rod. The foam was slightly more resilient than cork and a great deal more resilient than foam prepared from a cast methyl alpha-chloroacrylate polymer rod which had been foamed. The rod foamed from beads was uniform in diameter and it maintained the shape and dimensions of the vial very well despite flexing and stressing of the polymer rod. The individual beads of foam comprising the foamed rod where well knit together and the foamed rod could be cut without breaking out the individual beads. The resilience of the foamed rod was surprising when compared to the very slight resilience of the foam obtained from cast polymer. The strength and coherence of the foamed rod were surprising in view of the fact that the polymer beads contained no added adhesive before foaming and in view of the fact that the beads were heated only about 30° C. above their heat distortion temperatures during foaming. When the foamed rod was broken apart, there was no evidence that the foam broke along lines of individual beads and indeed several beads were identified which actually had been torn asunder during cleavage.

Thus the process of the present invention foams polymethyl alpha-chloroacrylate beads to yield voluminous, bulky particles of polymer having a very low density. The beads may be either discreet foamed spheres, or coalesced foamed beads of substantial sized structures possessing good strength and very low density.

While there are above disclosed but a limited number of embodiments of the process and product of the present invention, it is possible to provide still other embodiments without departing from the inventive concept herein disclosed, and it is therefore desired that only such limitations be imposed upon the appended claims as are stated therein or required by the prior art.

The invention claimed is:
1. The process for preparing foamed polymer comprising the steps in combination of mixing methyl alpha-chloroacrylate monomer, and a dyestuff foaming agent of the formula:

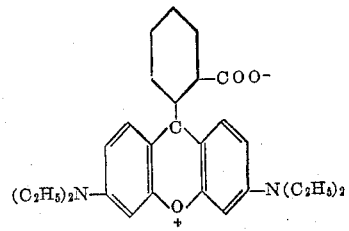

in water suspension, polymerizing the monomer to yield beads of polymer, separating the polymer beads from the water and foaming the beads by heating to a temperature sufficient to effect foaming.

2. The process for preparing foamed polymer comprising the steps in combination of mixing methyl alpha-chloroacrylate monomer, and a dyestuff foaming agent of the formula:

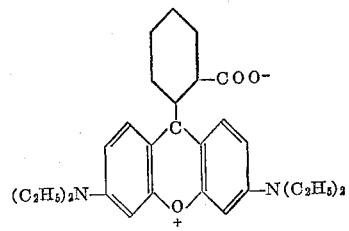

in water suspension, polymerizing the monomer to yield beads of polymer, separating the polymer beads from the water and foaming the beads by a heat treatment at a temperature of approximately 160° C.

3. The process for preparing foamed polymer comprising the steps in combination of mixing methyl alpha-chloroacrylate monomer, and a dyestuff foaming agent of the formula:

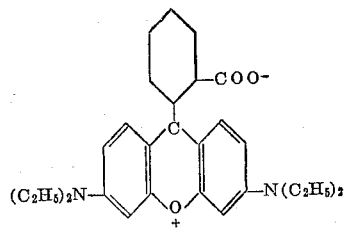

in water suspension, polymerizing the monomer by a heat treatment at a temperature of approximately 50 to 70° C. to yield beads of polymer, separating the polymer beads from the water and foaming the beads by a heat treatment at a temperature of approximately 160° C.

4. The process for preparing foamed polymer comprising the steps in combination of mixing methyl alpha-chloroacrylate monomer, and a dyestuff foaming agent of the formula:

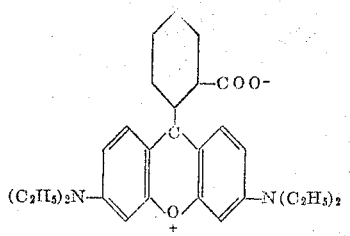

in water suspension, polymerizing the monomer to yield beads of polymer, separating the polymer beads from the water and foaming the beads by hot air at a temperature sufficient to effect foaming.

5. The process for preparing foamed polymer comprising the steps in combination of mixing methyl alpha-chloroacrylate monomer, and a dyestuff foaming agent of the formula:

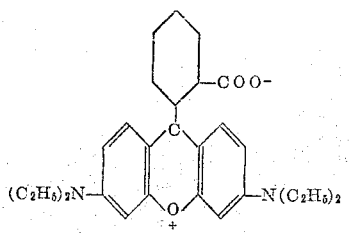

in water suspension, polymerizing the monomer to yield beads of polymer, separating the polymer beads from the water and foaming the beads by hot inert liquid at a temperature sufficient to effect foaming.

6. A process for the preparation of a foamed polymer comprising heating a composition comprising polymethyl alpha-chloroacrylate and a dyestuff foaming agent of the formula:

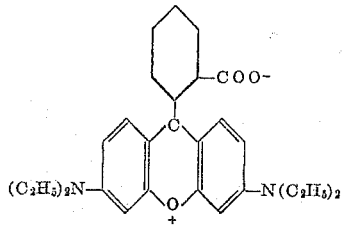

to a temperature sufficient to effect foaming thereof.

7. A process for the preparation of a foamed polymer comprising heating a composition comprising polymethyl alpha-chloroacrylate and from about 1 to about 10% based on the weight of said polymer of a dyestuff foaming agent of the formula:

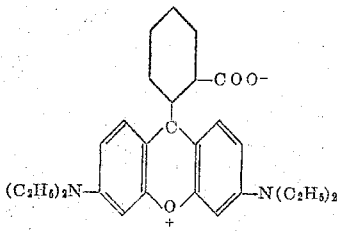

to a temperature sufficient to effect foaming of the polymer.

8. A process for the preparation of a foaming polymer comprising heating a composition comprising polymethyl alpha-chloroacrylate and from about 1 to about 4.2% based on the weight of said polymer of a dyestuff foaming agent of the formula:

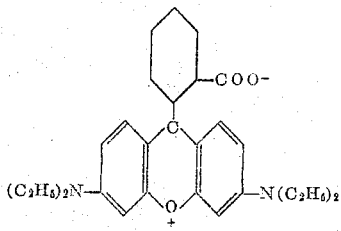

to a temperature sufficient to effect foaming of the polymer.

References Cited in the file of this patent

UNITED STATES PATENTS 2,684,341    Anspon et al. _____ July 20, 1954

OTHER REFERENCES

Colour Index—Ed. by F. M. Rowe, 1st edition, January 1924, published by Society of Dyers and Colourists Bradford—Yorkshire, England, page 190—Colour Index #749.